United States Patent
Dydek et al.

(10) Patent No.: US 11,561,553 B1
(45) Date of Patent: Jan. 24, 2023

(54) SYSTEM AND METHOD OF PROVIDING A MULTI-MODAL LOCALIZATION FOR AN OBJECT

(71) Applicant: Vecna Robotics, Inc., Waltham, MA (US)

(72) Inventors: Zachary Dydek, Waltham, MA (US); Daniel Theobald, Somerville, MA (US)

(73) Assignee: Vecna Robotics, Inc., Waltham, MA (US)

( * ) Notice: Subject to any disclaimer, the term of this patent is extended or adjusted under 35 U.S.C. 154(b) by 332 days.

(21) Appl. No.: 16/871,898

(22) Filed: May 11, 2020

(51) Int. Cl.
  *G05D 1/02* (2020.01)
  *G01S 17/86* (2020.01)
  *G01S 17/89* (2020.01)

(52) U.S. Cl.
  CPC ............ *G05D 1/0274* (2013.01); *G01S 17/86* (2020.01); *G01S 17/89* (2013.01); *G05D 1/024* (2013.01); *G05D 2201/0203* (2013.01)

(58) Field of Classification Search
  CPC .................. G05D 1/0274; G05D 1/024; G05D 2201/0203; G01S 17/86; G01S 17/89
  See application file for complete search history.

(56) References Cited

U.S. PATENT DOCUMENTS

| | | | | |
|---|---|---|---|---|
| 10,318,822 | B2* | 6/2019 | Gao | G08G 1/16 |
| 10,916,035 | B1* | 2/2021 | Kroeger | G05D 1/0212 |
| 2008/0033645 | A1* | 2/2008 | Levinson | G01S 5/0252 701/469 |
| 2010/0305854 | A1* | 12/2010 | Kammel | G01C 21/32 701/469 |
| 2016/0070265 | A1* | 3/2016 | Liu | G05D 1/102 701/25 |
| 2017/0124725 | A1* | 5/2017 | Sumiyoshi | H04N 13/239 |
| 2017/0277197 | A1* | 9/2017 | Liao | G06T 7/55 |
| 2021/0278222 | A1* | 9/2021 | Fischer | G06K 9/6289 |
| 2021/0331703 | A1* | 10/2021 | Duan | G05D 1/0274 |

* cited by examiner

*Primary Examiner* — Tan Q Nguyen

(57) ABSTRACT

An example method includes gathering, via a first module of a first type, first simultaneous localization and mapping data and gathering, via a second module of a second type, second simultaneous localization and mapping data. The method includes generating, via a simultaneous localization and mapping module, a first map based on the first simultaneous localization and mapping data and the second simultaneous localization and mapping data, the first map being of a first map type and generating, via the simultaneous localization and mapping module, a second map based on the first simultaneous localization and mapping data and the second simultaneous localization and mapping data, the second map being of a second map type. The map of the first type is used by vehicles with module(s) of the first and/or second types and the map of the second type is used by vehicles with a module of the second type exclusively.

21 Claims, 12 Drawing Sheets

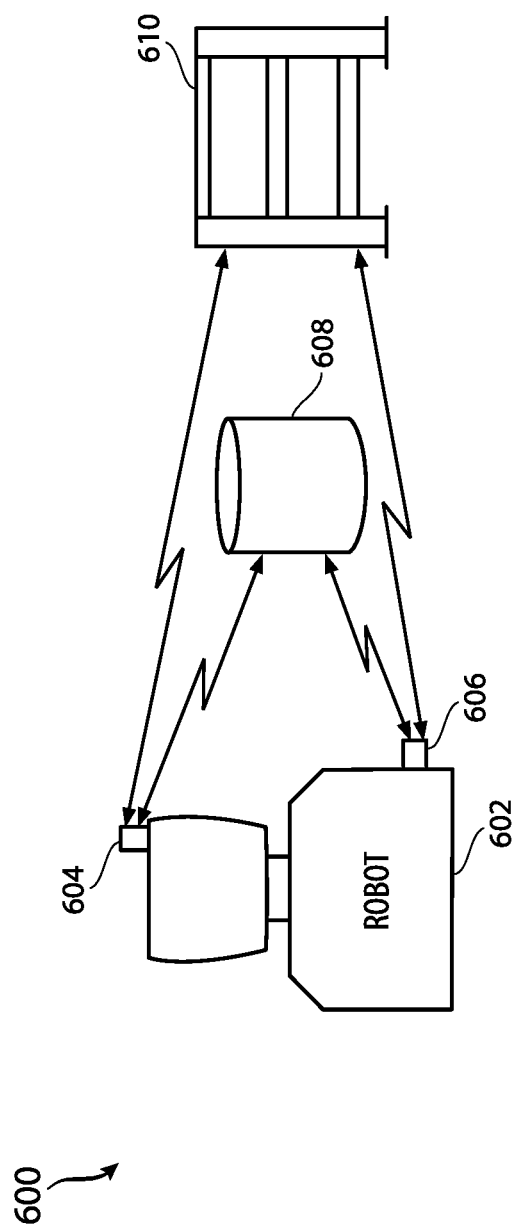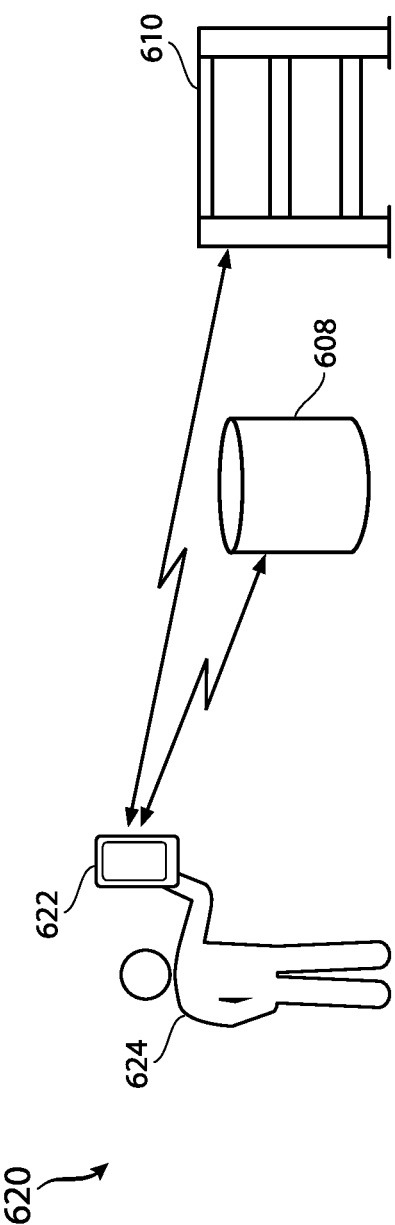

SYSTEM AND METHOD OF PROVIDING A MULTI-MODAL LOCALIZATION FOR AN OBJECT

FIELD OF THE INVENTION

The present technology pertains to robotics and more specifically to a system and method of providing a confirmation of a location of a device like a robot using a multi-modal localization approach.

BACKGROUND

The use of robots in many scenarios is greatly expanding. Hospitals, warehouses, homes, stores and other locations are using robots to perform many different functions. Robots can deliver medicine, transfer an object from one location to another, or perform other tasks. An important aspect of using robots in these various environments is the ability to identify a robot's location. Some robots have expensive but highly accurate localization systems such as two-dimensional or three-dimensional LiDARs (Light Detection and Ranging), UWB (Ultra-Wide Band) radios and accurate wheel odometry. However, not every robot can be equipped with such expensive systems.

Simultaneous localization and mapping (SLAM) refers to the process of constructing or updating a map of an environment while simultaneously keeping track of a robot or device within the environment that includes the localization system. There are several methods known that implement algorithms for performing SLAM. For example, methods include a particle filter, extended Kalman filter, XCovariance intersection and GraphSLAM.

Further, locating people in a warehouse environment is difficult. Outside of a warehouse, mobile devices of users can have access to Global Positioning System (GPS) satellites and cell towers. In some cases, the metal structure of warehouses makes accessing such technologies more difficult for the mobile devices that users carry around or for location modules on other vehicles.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6A illustrates the various different components on a robot that can be used to map the environment;

FIG. 6B illustrates a device having a single sensor component which utilizes the map generated as described herein;

DESCRIPTION OF EXAMPLE EMBODIMENTS

Figure 1A:
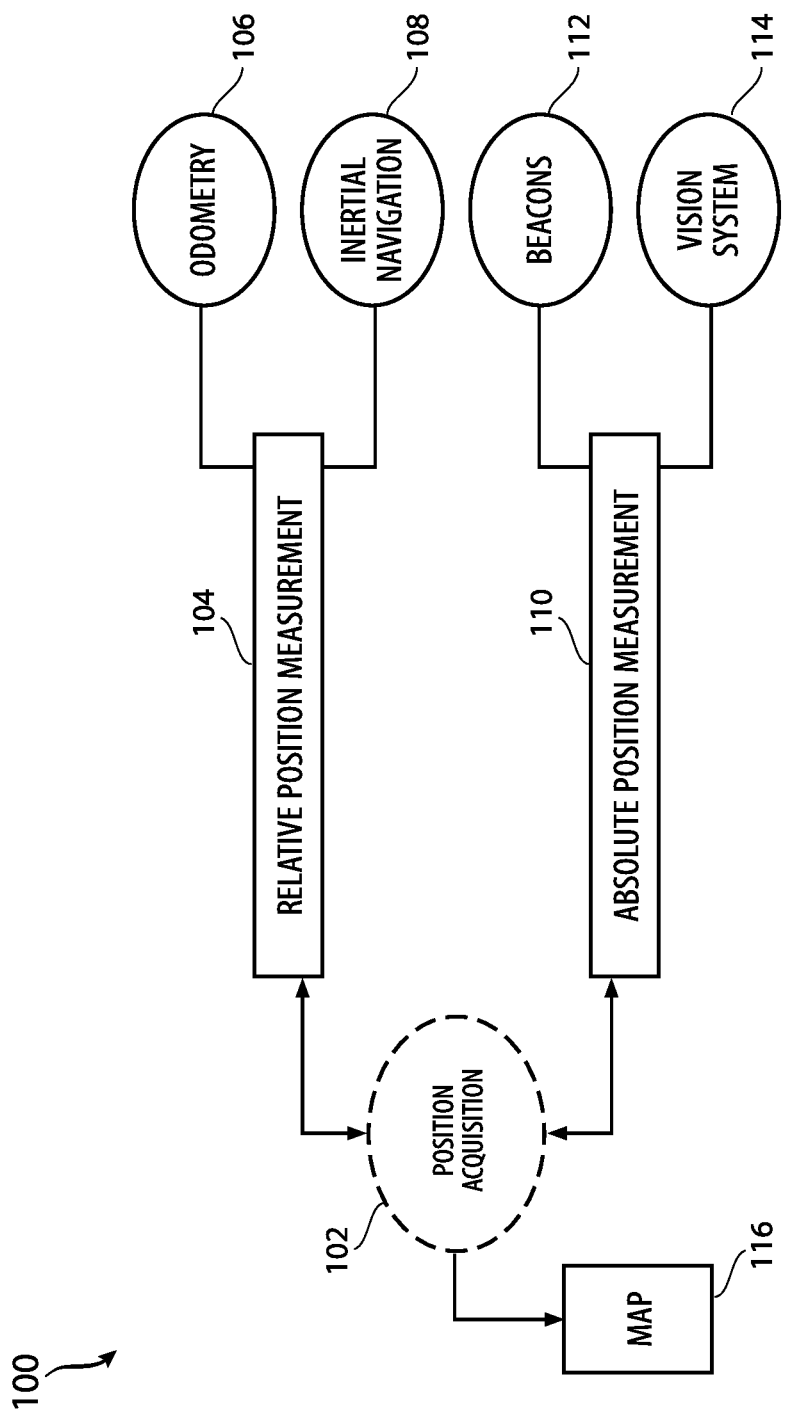
FIG. 1A illustrates the existing position acquisition process in SLAM.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term.

Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

For clarity of explanation, in some instances the present technology may be presented as including individual functional blocks including functional blocks comprising devices, device components, steps or routines in a method embodied in software, or combinations of hardware and software.

Overview

The present disclosure addresses the issue raised above with respect to localization systems for robots. It is noted that the scope of this disclosure, while discussed in the context of robots, is broad enough to encompass a localization system for any device such as a mobile phone, a vehicle, a drone, and so forth. The principles described herein can apply to any approach to identifying the location of any device. The approach can bridge the gap between robotic localization approaches like SLAM and can generate data that can be also used for localization for humans having mobile devices or other vehicles having location modules that are similar to those found in mobile devices.

SLAM algorithms are introduced above. Typically, these algorithms are tailored to the available resources and accuracy available from the localization system on a robot. The approaches have been employed for self-driving cars, unmanned aerial vehicles, autonomous underwater vehicles, planetary rovers, domestic robots and so forth. For example, a high accuracy or high quality map of an environment is generated via the SLAM algorithm and then later used by a robot or device having matching or similar technology, such as a high quality LiDAR system, for location identification in the environment. A LiDAR system can have a high level of accuracy in mapping or identifying points in the environment which can be mapped to location data such as a computer-aided-design map of a room. Overlays can be used to correlate points generated from the sensor, such as a LiDAR system, and location. What is needed, however, is the ability of a system to generate multiple mappings of different types or different qualities which can then be used by other devices which may not have matching technologies for determining location within the environment. For example, a map can be generated using one or both of a high quality module and a low quality module. The map can then later be usable by a person's mobile device, such as a mobile phone, for improved localization in an environment. The mobile device in that case exclusively has only a low quality module, but can use the generated map as described herein for an improved capability to localize. In one aspect, the different characteristics of the different modules or sensors are independent of quality but have the basis of their differences on types of data.

The present disclosure improves the SLAM algorithm approach with the following goal. The approach includes a first module or localization source that can be characterized as having a high-cost and high accuracy. The first module, for example, can include one or more of a two-dimensional or three-dimensional LiDAR (Light Detection and Ranging), an Ultra-Wide-Band radio, radar, accurate wheel odometry where the device, for example, is a robot having wheels, two-dimensional or three-dimensional sonar sensors, and so forth.

Next, in the system uses a second module or second localization source that can be characterized as a low cost localization source and may use such technology as an inertial measurement unit (IMU), two-dimensional or three-dimensional cameras, WiFi sensors, Bluetooth protocols, a Global Positioning System (GPS), a magnetometer, cellular triangulation, and so forth. These sensing devices can generally be characterized as localization components that can be found on a smart phone or mobile device. In another aspect, the first module and the second module can be of different types and have at least some different characteristics. Where the difference is cost, the definition of a high cost or a low cost can be relative to the first module compared to or relative to the second module. For example, if the first module would cost $1,000, and the second module would cost $50, these differences can aid in determining whether one is of high cost or low cost.

The disclosed approach involves performing a mapping of an area or SLAM operation combining or correlating data from the first module and the second module. These modules can be configured on the same device or robot for the SLAM operation. The process creates two maps. The first map is a feature-rich map for subsequent localization for vehicles with the first module or the first module and the second module. The second map is a feature-poor map for subsequent localization for vehicles with just the second module.

In one example, a robot within a warehouse or facility could localize, via the SLAM technique, very accurately with the first module and the second module and at the same time generate a map for slightly less accurate or less accurate in general but significantly lower cost localization for robots with the second module only. Generally speaking, the second module include sensors that are commonly available in mobile phone hardware.

An example method includes gathering, via a first module of a first type configured on a device, first simultaneous localization and mapping data (or just data, such as a location or an image), gathering, via a second module of a second type configured on the device, second simultaneous localization and mapping data (or just data in general, like images), generating, via a simultaneous localization and mapping module, a first map based on the first simultaneous localization and mapping data and the second simultaneous localization and mapping data, the first map being of a first map type and generating, via the simultaneous localization and mapping module, a second map based on the first simultaneous localization and mapping data and the second simultaneous localization and mapping data, the second map being of a second map type. The first map and the second map can then be used by other devices using localization technology. A later device having (exclusively) less accurate or costly localization components could use, for example, the second map in their localization process.

An example system includes a processor, a first module of a first type configured on the system, a second module of a second type configured on the system, a simultaneous localization and mapping module configured on the system and a computer-readable storage device storing instructions. The instructions which, when executed by the processor, cause the processor to perform operations including gathering, via the first module, first simultaneous localization and mapping data, gathering, via the second module, second simultaneous localization and mapping data, generating, via the simultaneous localization and mapping module, a first map based on the first simultaneous localization and mapping data and the second simultaneous localization and mapping data, the first map being of a first map type and generating, via the simultaneous localization and mapping module, a second map based on the first simultaneous localization and mapping data and the second simultaneous localization and mapping data, the second map being of a second map type.

In another example, a system could use the second map, for example, generated by the process described above, for localization in which the localization technology on the system matches or corresponds to a characterization of the second map, such as its characteristics or how its data is stored or how dense the data is in the second map.

DETAILED DESCRIPTION

Mobile robots perform complicated tasks that require navigation in complex and dynamic indoor and outdoor environments without any human input. In order to autonomously navigate, path plan, and perform these tasks efficiently and safely, the robot needs to be able to localize itself in its environment based on constructed maps. Mapping the spatial information of the environment can be done no prior knowledge of the robot's location. The SLAM approach introduced above is one way to generate maps of an environment that can be used for navigation. The approach disclosed herein introduces a novel method of generating the mapped spatial information yielding two maps and using two different modules (of different types). Data from both modules are used to generate the two different maps having different characteristics. The first map has a first set of characteristics and can be used for subsequent localization by a device having the first type of module or both the first type of module and the second type of module. The second map has a second set of characteristics and can be used for subsequent localization by the device or robot having just the second type of module. Generally, the respective first map or second map will correspond to or match the technical capabilities of the device (robot or human having a mobile device) that will later use that map for localization in an environment.

The approach herein can enable the generation of multiple maps that can then be utilized by devices with different capabilities. For example, operating a robot in a warehouse to generate the two different types of maps can enable the later localization for a mobile phone in which the localization sources for the mobile phone can utilize the second type of map and the localization components available and thereby provide an improvement with respect to the localization capabilities of the mobile phone.

In one example, assume a robot has a first module including LiDAR and accurate localization capabilities. The second module has a camera, similar to a camera on a commercial mobile phone. In the mapping phase, the camera on the robot may take an image of an isle number (say, number 72) in a warehouse. That image in and of itself does not provide any location data in that that second module does not localize the position of the robot. The second module just takes the picture. However, using data from the first module that does include localization data, the system can generate a map that can include information such as tags, metadata, or other data associated with the images. When the number 72 is identified as in the image taken by the camera, in a particular position, having a particular size or based on some other characteristic, the system can correlate that information with the location information from the first module. A map can be generated which can correlate two different types of data into one resulting map. Such a map that includes the location data (of one type) correlated to the image data (of a second type) can then later be used by a person or vehicle with a mobile device and that has a camera to improve the localization of that mobile device. Of course any two types of data can be applied. Any type of location-based data from the first module can be combined with or correlated to another type of data from the other module (images, video, sound, or any combination of these input modalities).

Data used to correlate the camera image (or any type of data) from the second module with the location data of the first module can include the focal length of the camera, a location of identifying features such as numbers or structures, light conditions in the environment, a source location of light or lights, a motion of the camera, a vector which can identify a camera direction, a height of the camera from a reference level such as a floor, an orientation of an object in the image, and so forth. Any one or more of these characteristics can be used to correlate the image with a location and which can be used to label, add metadata, or otherwise generate a map for use by a device that also will use a camera (for example) and need to know a location of the device.

This approach enables an improvement in the localization capabilities of many vehicles, devices, robots, and so forth that may not be equipped with a high-cost and high accuracy localization source but may be equipped with lower cost localization sources that are commonly available on mobile phones or may be implemented in vehicles or robots. Thus, the cost of making available a localization capability for a device having this lower cost localization component is reduced. This is because the device can access the particular map that is created in coordination with both the high cost high accuracy localization source and the complementary low cost localization source is described herein.

The system can generate one or more maps in a mapping phase. In one aspect, a device can be loaded with both maps (or more maps) and then choose which map to use based on a parameter or data associated with the capabilities of the localization components on the device. For example, the system might determine what types of sensor modules are operational and then select the matching map for localization.

FIG. 1A illustrates an existing approach to using sensors to gather position acquisition information. There has been interest about the use of technology from the robotics and autonomous vehicle industries for indoor mapping where GPS (Global Positioning System) or GNSS (Global Navigation Satellite System) are not available. SLAM technology applies a process where a robot builds a map representing its spatial environment while keeping track of its position within the built map. SLAM data can be represented as any data gathered from a first module or a second module for the purpose of representing the spatial environment around a device while keeping track of the location of the device in the built map.

While the SLAM approach is discussed herein, the particular method of generating multiple maps of different types for an environment can also be performed using other approaches as well.

FIG. 1A illustrates a position acquisition approach 100 to applying SLAM. This disclosure introduces concepts, in the context of the new ideas for SLAM mentioned herein, ranging from basic localization techniques such as wheel odometry, to the more advanced SLAM techniques such as visual-based SLAM. This disclosure also includes development in the area of monocular sensors and RGB-D (Red-Green-Blue-Digital) sensors for dense 3D reconstruction of the environment. FIG. 1A illustrates general localization methods. Robot localization requires sensory information regarding the position and orientation of the robot within the built map. Each method involves some limitations, so proper sensor fusion techniques are deployed to overcome the constraints of each sensor alone.

FIG. 1A shows a SLAM system 100 for obtaining position information 102 including a relative positioning measurement component 104 which receives odometry information 106, intertial navigation information 108. The simplest form is to use wheel odometry 106 methods that rely upon encoders to measure the amount of rotation of wheels. In those methods, wheel rotation measurements are incrementally used in conjunction with the robot's motion model to find the robot's current location with respect to a global reference coordinate system. The most significant error source is wheel slippage in uneven terrain or slippery floors. An inertial measuring unit (IMU) is also used to measure the linear and rotational acceleration of the robots. However, it can still suffer from factors like extensive drift and sensitivity to bumpy ground.

Like with odometry, the system acquires position estimates from inertial navigation 108 by integrating the obtained information from the sensors; once for obtaining the speed, twice for obtaining the traveled distance of the robot. The systems are independent of external information sources. However, since measurements are made by integration, the position estimates drift over time, and can lead to increased errors.

The system 100 also includes an absolute positioning measurement component 110 that uses laser ranger finders as part of a vision system 114. As optical sensors, these components estimate a distance by calculating phase difference between an electromagnetic wave sent and rebounded. In large-scale environments, there are bound to be areas devoid of features visible by a laser range finder, like open atria or corridors with glass walls.

The localization approach can also utilize WiFi protocols. Beacons 112 can generate a graph-based WiFi map by collecting the signal strength across the field. In this approach, the mean and standard deviations of WiFi RSSI (Received Signal Strength Indicator) observations are approximated by linear interpolation on a graph. This leads to a computationally efficient observation likelihood function and the optimized location could be derived from the probability function. However, it is restricted to the WiFi signal covered area with the information of a pre-learned WiFi graph. Gaussian Process-learned WiFi graphs for a single access point can be used. The mean RSSI values can be coded, varying from −90 dBm to −20 dBm. The locations where the robot observed signals from the access point can be marked in some manner. The end result of the position acquisition information is the generation of a map 116 representing the space which can be used for later localization of a device and to be updated by further data. In one example, IEEE 802.11mc could be used, which is a wireless standard that includes more accurate positioning processes than just RSSI-based estimates.

Robots can use a Global Positioning System (GPS) that allows the acquisition of position information. With exact prior knowledge of where the satellites are, once the receiver calculates its distance from three or more satellites using the travel time of the radio signals, the true location can be calculated. Of course, poor coverage of satellite signal for indoor environments will limit its accuracy, thus introducing a need for the concepts disclosed herein. The GPS measurement supplies information about the location of the robot independent of previous location estimates. The location is not derived from integrating a sequence of measurements, but directly from one measurement. The GPS approach has the advantage that the error in the position does not grow unbounded, as is the case with relative position techniques.

Mobile robots can be equipped with several sensor systems to avoid the limitations when only one sensor is used to reconstruct the environment. Relative position measurements provide precise positioning information constantly, and at certain times, absolute measurements are made to correct potential errors. There are a number of approaches to sensor fusion for robot localization, including merging multiple sensor feeds at the lowest level before being processed homogeneously, and hierarchical approaches to fuse state estimates derived independently from multiple sensors.

The position measurements can be fundamentally combined in a formal probabilistic framework, such as the Markov Localization framework. Based on all available information, the robot can believe to be at a certain location to a certain degree or with a certain confidence. The localization problem consists of estimating the probability density over the space of all locations. The Markov Localization framework combines information from multiple sensors in the form of relative and absolute measurements to form a combined belief in the location. The location data obtained from such approaches can apply to this disclosure where the location data is correlated to other types of data such as image data to generate a map.

The SLAM approach introduced herein is an implementation of a navigation system that uses artificial landmarks or a priori known maps of the environment, and accurate sensor systems to get precise measurements of the landmarks or map features. This general approach is used by today's robots. The task of building a map of the environment given the exact position of the robot is largely a solved problem. However, it is much harder to solve the complete problem simultaneously, enabling a mobile robot to build a map of an unexplored environment while simultaneously using this map to localize itself. Further, as noted above, the problem exists of high cost and high accuracy modules being used to map out an environment in which the resulting map is not useful for a later robot or device (or person with a mobile device) having a low cost low accuracy module.

With the prior knowledge of the environments, mobile robots could perform a set of tasks. For instance, a map can inform path planning or provide an intuitive visualization for a human operator. Also, the map limits the error committed in estimating the state of the robot. Without a map, dead-reckoning would quickly drift over time. On the other hand, using a map (e.g. a set of distinguishable landmarks) the robot can "reset" its localization error by re-visiting known areas.

Without the map, data association becomes much more difficult, namely the unknown mapping between landmarks and observations when the robot position estimation is prone to uncertainty. There are improvements in a new robust-perception age, where performance with a low failure rate, a high-level understanding of the dynamic environments, the flexibility to adjust the computation load depending on the sensing and computational resources, and task-driven perception are required. Other challenges include dealing with methods enabling large-scale implementations in increasingly unstructured environments and especially in situations where GPS-like solutions are unavailable or unreliable: in urban canyons, under foliage, under water, or on remote planets, for example. The map-generation approach disclosed herein can also assist to improve location systems in these environments.

The popularity of the SLAM problem is correlated with the emergence of indoor mobile robotics. The use of GPS has no ability to bound the localization error for indoor usage. Additionally, SLAM offers an appealing alternative to user-built maps, showing that robot operation is approachable even in the absence of a purpose-specification localization infrastructure.

Some applications of SLAM include: (1) Automatic car piloting on unrehearsed off-road terrains; (2) Rescue tasks for high-risk or difficult-navigation environments; (3) Planetary, aerial, terrestrial and oceanic exploration; (4) Augmented reality applications where virtual objects are involved in real-world scenes; (5) Visual surveillance systems; and (6) Medicine. Other applications can be considered as well.

Building 3D reconstruction of objects becomes equally applicable with the advancement of visual-based SLAM as well.

Sensors used in the systems disclosed herein can fit into two main categories: interoceptive sensors and exteroceptive sensors. Interoceptive sensors, like wheel odometers and IMUs, generate relative position measurements. They are subject to non-systematic errors due to external causes like human intervention as well as systematic errors because of imperfections in the robots' structure. Exteroceptive sensors, including cameras, radars and lasers, can provide absolute position measurements. If used alongside each other, they could compensate for errors like odometry drift. The three major types of sensors applied to current SLAM technology are acoustic sensors, laser rangefinders, and visual sensors. In one aspect, however, the present disclosure relates to one type of sensor, such as a camera of the type in a mobile phone (that does not provide location information), that generates images that need to be correlated with data from sensors as described above that can obtain detailed location data to generate a new specialized map for use by later mobile phones with cameras (that do not determine location directly).

Other types of sensors are further discussed. For example, acoustic sensors use the Time of Flight (TOF) technique to measure location. Sonar sensors are used underwater where laser rangefinders and visual sensors are ruled out. Lower frequency sonars minimize absorption, and sonar provides much better resolution in a subsea environment. However, the monotony of subsea regions means sonar depth information is much harder to interpret with high angular uncertainty. Ultrasonic sensors are generally the cheapest available source of spatial sensing for mobile robots. They are compatible with most surface types, whether metal or non-metal, clean or opaque, as long as the surface measured has sufficient acoustic reflectivity. However, low spatial resolution and sensing range, sensitivity to environmental factors, and slow response speeds hampers use of ultrasonic sensors in robots.

Laser rangefinders also use ToF (time of flight) and phase-shift techniques to measure position. The high speed and accuracy of laser rangefinders enable robots to generate precise distance measurements. This contributes to the significant popularity of laser rangefinders in solving SLAM problems since they are capable of obtaining robust results in both indoor and outdoor environments. A laser scanner is the best sensor for extracting planar features (like walls) due to the dense range data provided. However, as noted above, the price is the usual stumbling block. For example, a 3D LiDAR system from Velodyne with accuracy ranging within 2 cm can cost $75,000.

Acoustic sensors, LiDAR, and other range-finding sensors lack the ability to use surface properties to localize and identify objects. Color and grayscale images allow robots to use a wider set of information to identify and localize features in the environment.

Visual sensors are mainly three types: monocular cameras, stereo cameras, and RGB-D (red-green-blue-digital) cameras. Rich visual information is available from passive low-cost visual sensors which LiDAR lacks. However, the trade-off is a higher computational cost and the requirement for more sophisticated algorithms to process the images and extract the necessary information. Systems embedded with cameras and IMU are also the main focus for future developments in SLAM. Any of these types of sensors can be used in the context of this disclosure where location-based information can be obtained and correlated to other types of data obtained from a module on the robot. For example, any data from sensors described above can be used to correlate location data with a different type of data, such as a camera image that independently does not provide any location data. Radar is another example of technology that is improving and could be used in the systems disclosed herein. Radar can represent a high resolution sensor that can filter noise using machine learning methods.

Camera technology used in SLAM techniques is discussed next. One of the major reasons monocular cameras can be used in SLAM problems is the hardware needed to implement it is much simpler, leading to the systems that are cheaper and physically smaller. SLAM in this respect can be accessible on mobile phones without the need for additional hardware. A weakness, however, is that the algorithms and software needed for monocular SLAM are much more complex because of the lack of direct depth information from a two-dimensional image. Nevertheless, by integrating measurements in the chain of frames over time using a triangulation method, it is possible to jointly recover the shape of the map (and the motion of the camera under the assumption that cameras are not still). But since the depths of points are not observed directly, the estimated point and camera positions are related to the real positions by a common, unknown scale factor. The map therefore becomes a dimensionless map without any real-word meaning attached to one map unit.

In order to address the scale availability issue, there are some alternatives other than stereo cameras. Real metric scaling can be introduced by an external scale reference in the form of a pre-specified object or a set with known size that can be recognized during mapping.

One of the easiest ways to acquire depth information directly is through stereo cameras. A stereo camera system consists of two cameras separated by a fixed distance; observations of the position of the same 3D point in both cameras allows depth to be calculated through triangulation, the same way humans do with our eyes. It rules out the constraints that the depth information will be unapproachable without cameras moving, as is the case with monocular cameras. However, the depth measurement range is limited by the baseline and resolution. Generally, the wider the baseline, the better the depth estimate, though setup with a wider baseline needs a larger space. The baseline on an AR (Artificial reality) headset will usually be only around 20 cm; and much less on a mobile phone. Considering the heavy computational workload, FPGA (Field Programmable Gate Array) becomes the main force to process the high input data rate.

Most of the SLAM systems deploy RGB-D cameras that generate 3D images through structured light or time-of-flight technology, both of which can provide depth information directly. In terms of a structured light camera, the camera projects a known pattern onto objects and perceives the deformation of the pattern by an infrared camera to calculate the depth and surface information of the objects. For a time-of-flight camera, the camera obtains depth information by measuring the time of flight of a light signal between the camera and objects. Compared to RGB-D cameras based on time-of-flight technology (e.g. Kinect for Xbox One), the structured light sensors (e.g. Kinect for Xbox 360) are sensitive to illumination. This limits their applicability in direct sunlight. Apart from that, RGB-D cameras can have various overarching limitations. They do not provide reliable range data for semi-transparent or highly reflective surfaces, and also have a limited effective range.

Figure 1B:
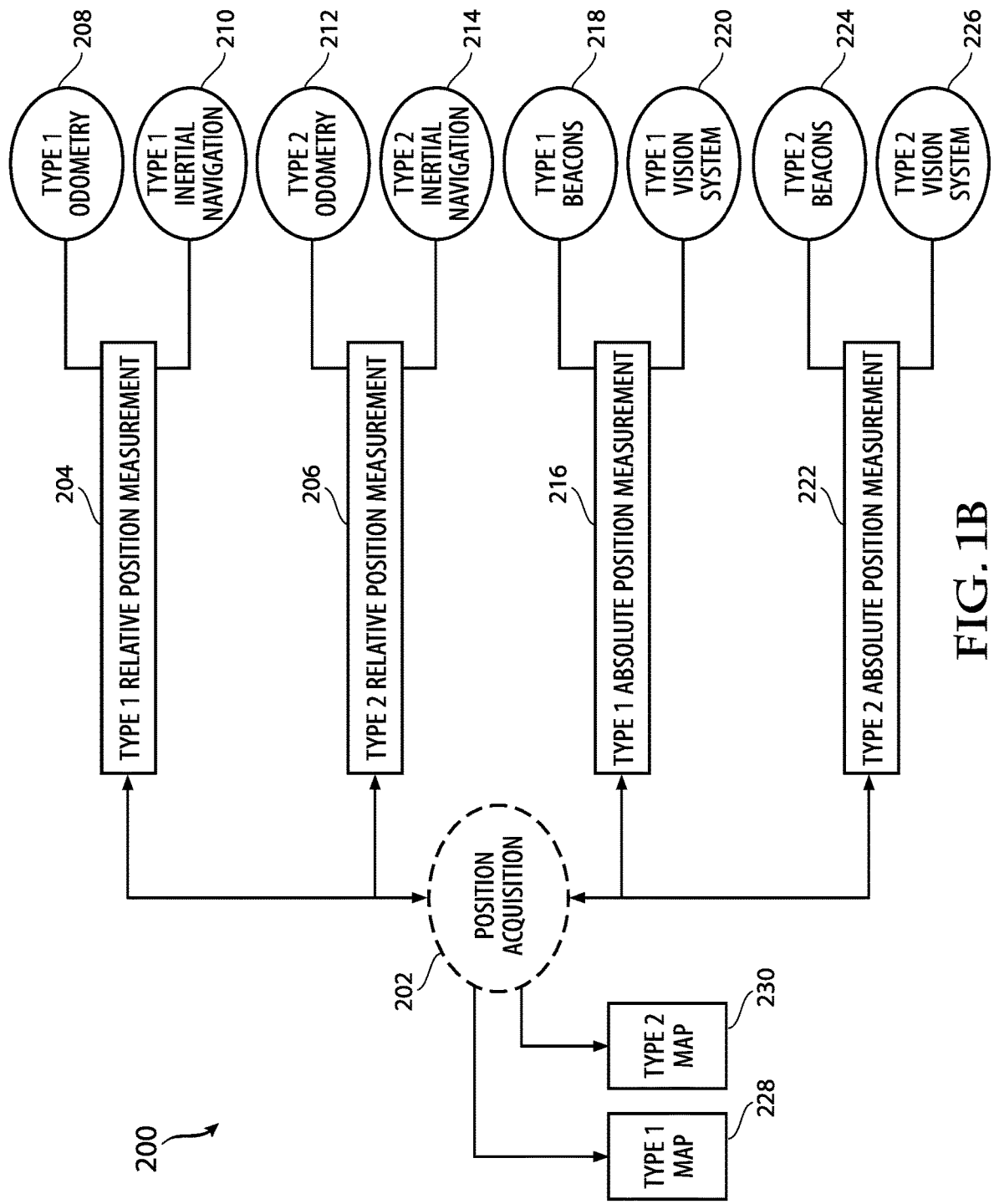
FIG. 1B illustrates the extension of the SLAM process to use different module types to gather position acquisition information to generate two maps.

Having discussed various features and systems implementing the SLAM approach, the disclosure now turns to discuss in more detail the concepts disclosed herein. FIG. 1B illustrates further principles of this disclosure. The system 200 extends the previous SLAM system by establishing two separate modules for gathering sensor data for position acquisition 202. The first module can be characterized generally as a "type 1" module or more specifically, a module with certain characteristics, such as high cost and high accuracy. This would include one or more of, for example, the type 1 relative position measurement 204 which uses certain type of odometry sensor 208 and a certain inertial navigation component 210. A type 1 absolute position measurement system 216 can use one or more of a certain type of beacon 218 and a certain type of visual system 220. The data from such devices is provided to obtain position acquisition information 202. These various systems can be either "type 1" or "type 2" as shown in the figure.

Another second module can include a "type 2" relative position measurement component that uses one or more of a certain type of odometry system 212 and a certain type of IMU system 214. A type 2 absolute position measurement system 222 can include one or more of a certain type of beacon 224 and a certain type of vision system 226, such as a camera used in commercial mobile phones or other mobile devices. The system provides the data gathered by this module to be combined with data from the type 1 module as part of the position acquisition information 202. The system 200 produces a first map 228 and a second map 230 which have different characteristics. For example, the first map can be considered a feature-rich map that can be used for devices having only the first module or with devices and the first module and the second module. The second map 230 can be a feature-poor map that is used for subsequent localization for devices with just module 2. In other words, the feature-poor map might correlate images with the location data from the first module such that a later mobile phone held by a person can be used to take images of a warehouse location, and based on characteristics of the image, the map can include location information generated from the mapping phase and provide the location information. The metadata or other information can be provided to the second map simultaneously as the information is received from one or more sensors and can be correlated with the data from module 2.

Next is discussed a visual-based SLAM implementation framework. There has been an increased interest in visual-based SLAM because of the rich visual information available from passive low-cost video sensors compared to laser rangefinders. The majority of modern visual-based SLAM systems are based on tracking a set of points through successive camera frames, and using these tracks to triangulate their 3D position to create the map. The system simultaneously uses the estimated point locations to calculate the camera pose that could have observed them. This disclosure provides another approach in which, for example, a robot having both a pass low-cost video or image sensor as well as a more expensive laser rangefinder are used together to gather data 202 to produce two maps 228, 230.

Figure 3:
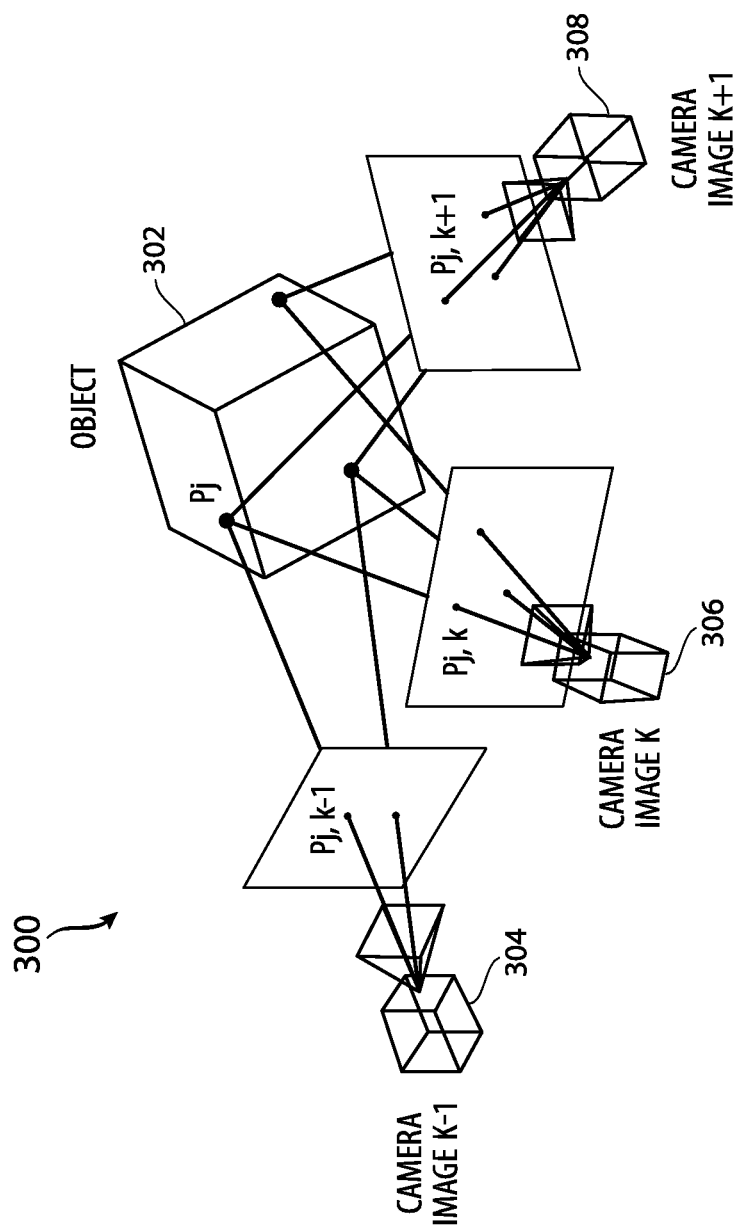
FIG. 3 illustrates a visual-SLAM approach with different cameras at different locations.

FIG. 3 illustrates an example of the basic working principle of visual-SLAM 300, from point observation and intrinsic camera parameters. The real time 3D structure of a scene is computed from the estimated motion of the camera. An object 302 can be mapped from different cameras 304, 306, 308 at different positions in which different object points $P_j$ are mapped to respective feature points $P_{j,\ k-1}$ on a plane orthogonal to a line between a respective camera and the object point $P_j$. In this example, all three cameras 304, 306, 308 can be of one type and another set of cameras could be deployed which are of a different type. In another example, camera 304 could be of a first type and camera 306 could be of a second type. Any prior visual-SLAM approaches do not perform the steps disclosed herein with respect to generating at least two maps, one of which is generated for later use by a device having the corresponding characteristics (lower cost or image gathering characteristics, for example) of the second module used in the mapping phase.

Figure 4:
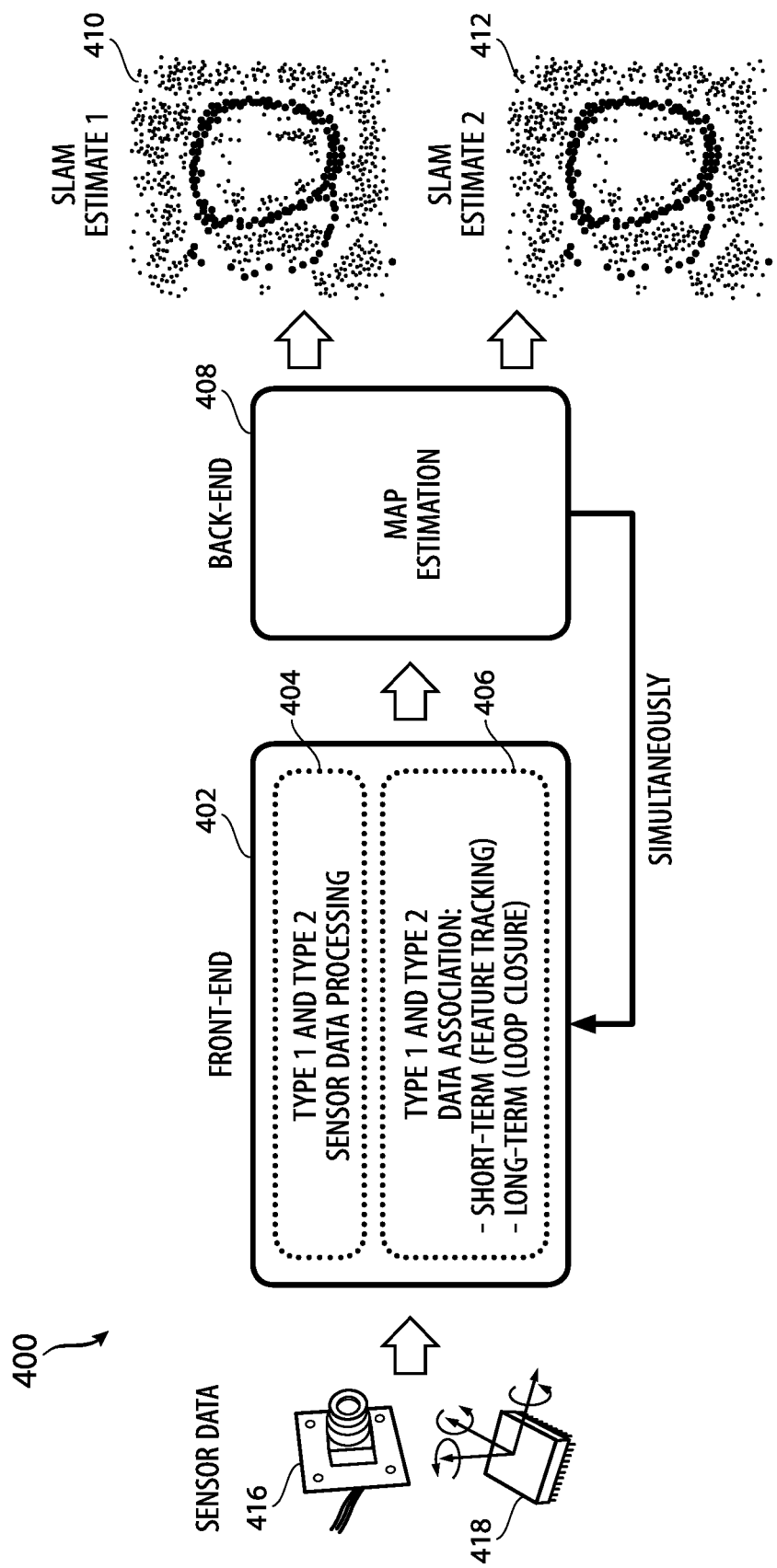
FIG. 4 illustrates the front end and back end of a visual SLAM system according to the principles disclosed herein.

FIG. 4 illustrates the architecture of a SLAM system 400 and includes two main components: the front-end 402 and the back-end 404, according to the present disclosure. The front-end 402 abstracts sensor data 416, 418 into models that are amenable for estimation, while the back-end 408 performs inference on the abstracted data produced by the front-end 402. The front-end 402 includes a type 1 sensor data and a type 2 sensor data processing component 404 and a type 1 and type 2 data association component 406. A component can track or associate data such as short-term data for feature tracking and long-term data such as closure in which a robot performs a loop in a building. By performing the loop, the data seen by the device will be duplicated as the robot returns to a previous location.

The back end component 408 also includes a map estimation component that simultaneously provides the generated map to the front-end component 402. As noted herein, the sensor data 416, 418 in the present disclosure comes from a first module of a first type and a second module of a second type. The output of the system 400 is a first map estimate 410 and a second map estimate 412. The characteristics of different modules in the different maps can be defined in different ways but generally speaking, the purposes disclosed herein, involve the first type being a feature-rich map which it is generated from the high cost and high accuracy localization source such as a LiDAR, radar, and so forth. The second type of module or second type of resulting map as a feature-poor map that is generated from low cost and accuracy systems such as a camera, WiFi system, GPS system, IMU component and so forth. While this disclosure focuses on the different types being high cost of a low cost, in another aspect, the first type could be visual and the second type could be beacon-based. In yet another aspect, the first type could be a relative position type and the second type could be an absolute position type or an image type. One of the types, such as a camera image, might not provide any location-based data inherently in the data. The first type could be an odometry-based component and the second type could be a visual system. These are different examples of the different types of sensors that can be applicable herein. The processing described herein, when the types of data are different, such as location-based data as one type and image-only data as a second type, involves correlating the different types of data to generate a mapping that can later be used by a mobile device that has capabilities corresponding to one of the types. For example, a device that can take images but does not have good location-based capabilities can use a generated map to evaluate images taken by the device and output an estimate of the location of the device in the environment.

Short-term data association is responsible for associating corresponding features in consecutive sensor measurements. On the other hand, long-term data association (or loop closure) is in charge of associating new measurements to older landmarks. Such information can be used to generate one or both of the maps described herein.

Figure 2:
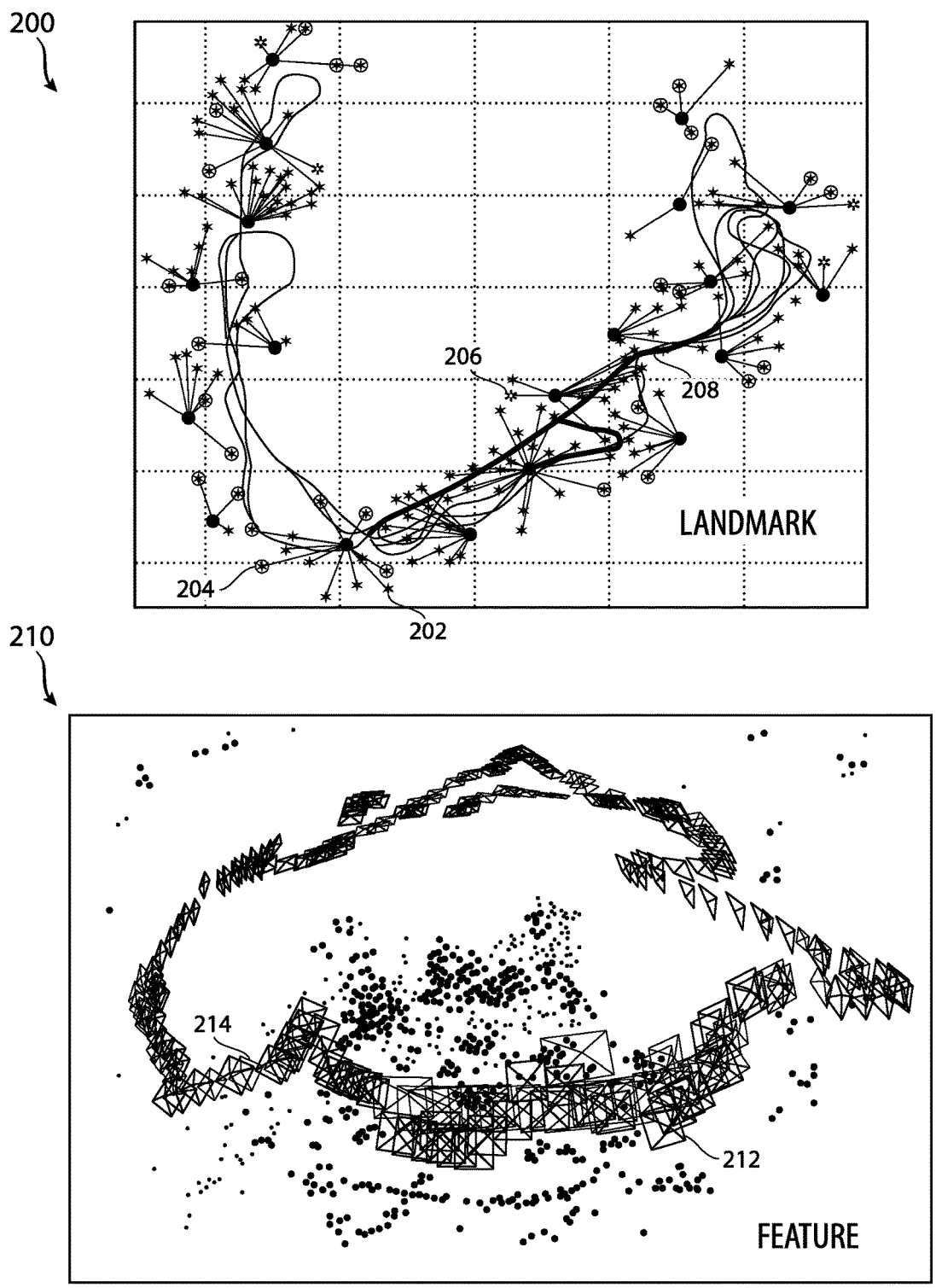
FIG. 2 illustrates different resulting maps from the SLAM analysis.

FIG. 2 illustrates some example maps 228, 230 that are output from the system with two modules as described herein. A landmark map 200 includes data points shown by way of example as 202, 204, and 206. The points representing landmark along a path 208 of the robot. A feature map 210 shows various features 212, 214 identified by a robot having a module and sensors as described herein. There are a variety of ways the mapping representations 228, 230 can be implemented.

As noted above, the system can output different types of data from the SLAM method and particularly the visual-SLAM method. The way that SLAM systems use the image data can be classified as sparse/dense and feature-based/direct. The former describes the quantity of regions used in each received image frame, and the latter describes different ways in which the image data are used.

Next are discussed the sparse and dense methods related to SLAM. From the perspective of which areas in an acquired image are used, SLAM systems can be classified as either sparse or dense. More specifically, sparse SLAM systems use only a small selected subset of the pixels in an image frame, while dense SLAM systems use most or all of the pixels in each received frame. These different types of SLAM can be related to, for example, a high cost system which provides most or all of the pixels in a frame or a less expensive system in which a more sparse subset of available pixels is obtained. Data from a dense SLAM system can be used to generate the map for sensors of a sparse SLAM system or for systems only capable of taking images, for example.

As they use a different number of pixels and regions in a given area, the generated maps from sparse and dense methods are very different. In one aspect, map 228 could be a dense map and map 230 could be a sparse map or a semi-dense map. The maps generated from sparse methods are basically point clouds, which are a coarse representation of the scene and mainly used to track the camera pose (localization). On the other hand, dense maps provide much more details of viewed scenes, but because they use many more pixels than sparse methods, more powerful hardware is usually needed (most current dense SLAM systems require GPUs). In an example system disclosed herein, a first module can provide the data for a dense map, and a second module can provide the data for a sparse map. The system can generate, based on the data, both maps as part of its process. The system can make one or both maps available for subsequent localization for devices having the first module only or the first module and the second module. The system can make one or both maps available for systems having only the second module.

Figure 5A:
FIG. 5A illustrates a sparse method of acquiring images.
Figure 5B:
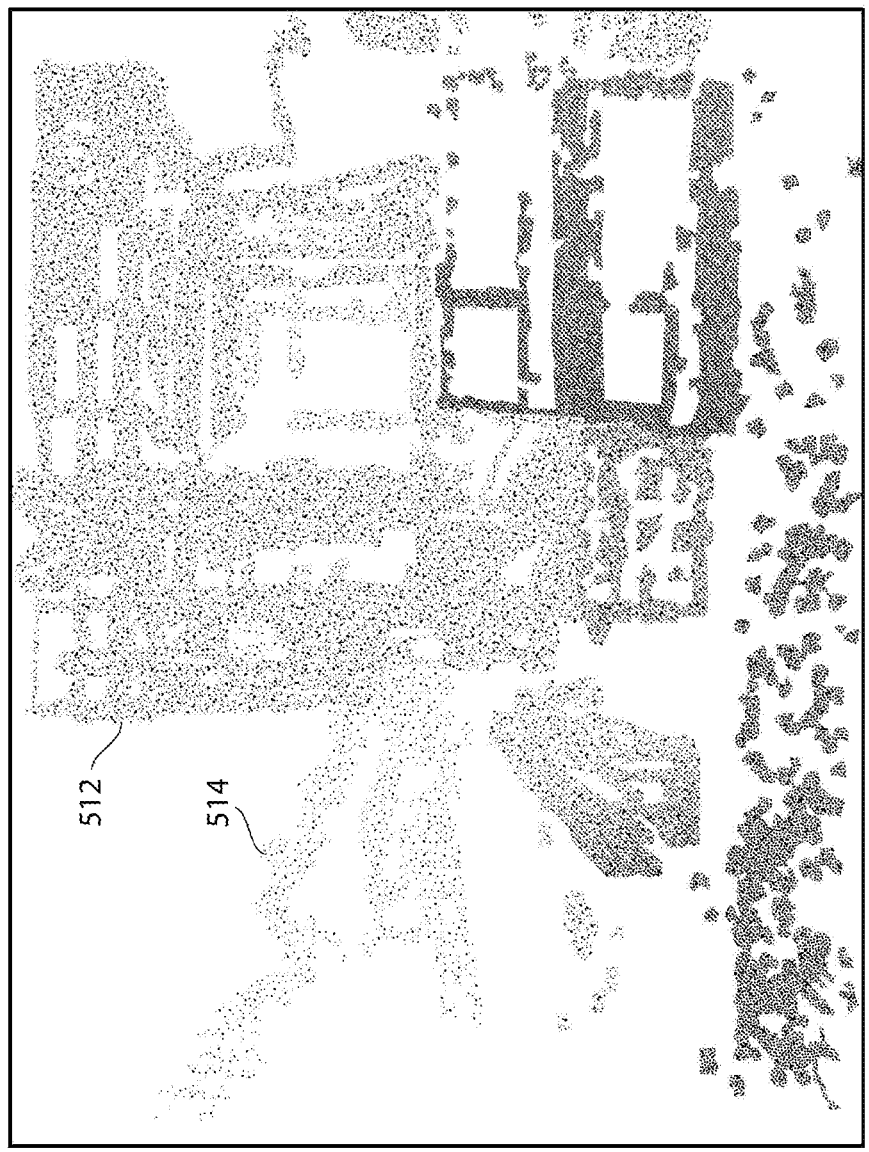
FIG. 5B illustrates a semi-dense map in an LSD-SLAM (Large-Scale Direct-SLAM)
Figure 5C:
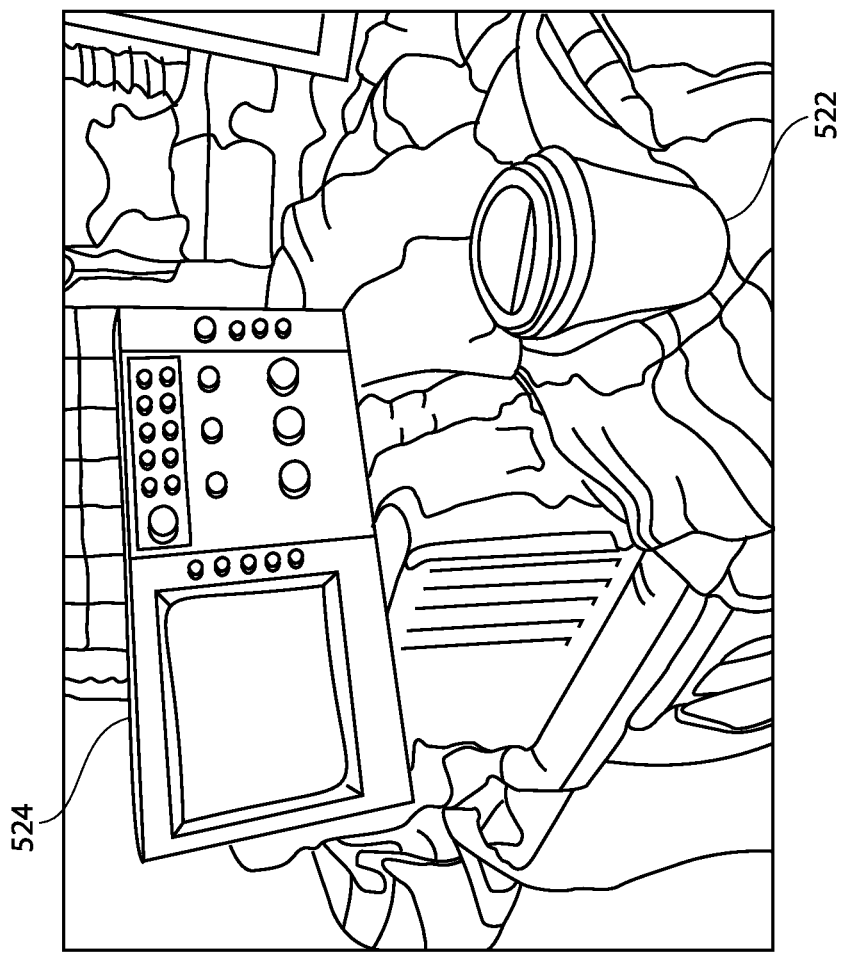
FIG. 5C illustrates a dense map generated by a DTAM (Dense Tracking and Mapping) system.

FIGS. 5A-5C illustrates the difference between maps generated by sparse and dense SLAM systems. FIG. 5A is a sparse map 502 created by PTAM (Parallel Tracking and Mapping), where the points are map points 504, 506, 508. FIG. 5B is a semi-dense map in a LSD-SLAM (Large-Scale Direct-SLAM), where the points 512, 514 are map points. LSD-SLAM stands for large scale direct monocular SLAM. A LSD-SLAM generates a consistent global map, using direct image alignment and probabilistic, semi-dense depth maps instead of keypoints. FIG. 5C represents a dense map generated by the DTAM (Dense Tracking and Mapping) system, which is a dense tracking and mapping in real time system. All points on the surface 522, 524 are part of the map. These different maps are non-limited examples of different types of maps that can be generated as part of this disclosure as well as the types of data that can be used to generate one or both of the maps described herein. Such data can also be correlated with images from a low accuracy or low cost module on a robot in a mapping phase to enable a labeling or metadata using data from sensors having different characteristics from the low accuracy or low cost module. It is noted that this disclosure contemplated generating at least two maps as part of the SLAM process. If there are more than two maps, then in the set of maps there must be at least two that are of different types.

FIG. 6A illustrates a system 600 in which a robot 602 has a first sensor 604 and a second sensor 606. These two different types of sensor are shown in different positions on the robot 602 but could be configured next to each other or at any location on the robot 602. An item 608 in the environment around the robot 602 is sensed as well as a shelf 610 which can be, for example, a shelf in a warehouse. As noted above, the cost, complexity, resolution, or other technical capabilities of these different sensors 604, 606 can be different. Data from one of the sensors 604 can be used to label, define, locate a position, generate metadata, and so forth for a mapping associated with a different sensor 606. The mappings that are generated can take these differences into account.

FIG. 6B illustrates the later use 620 of the generated map by a device 622 in an environment containing the item 608 and 610. The user 624 (where the device 622 is a mobile phone) or another robot having a sensor component of a certain type that might generally correspond, for example, to sensor module 606 in FIG. 6A, can use the generated map for location-based services when, for example, the device 622 can only take images and does not have other location-based capabilities.

Figure 7:
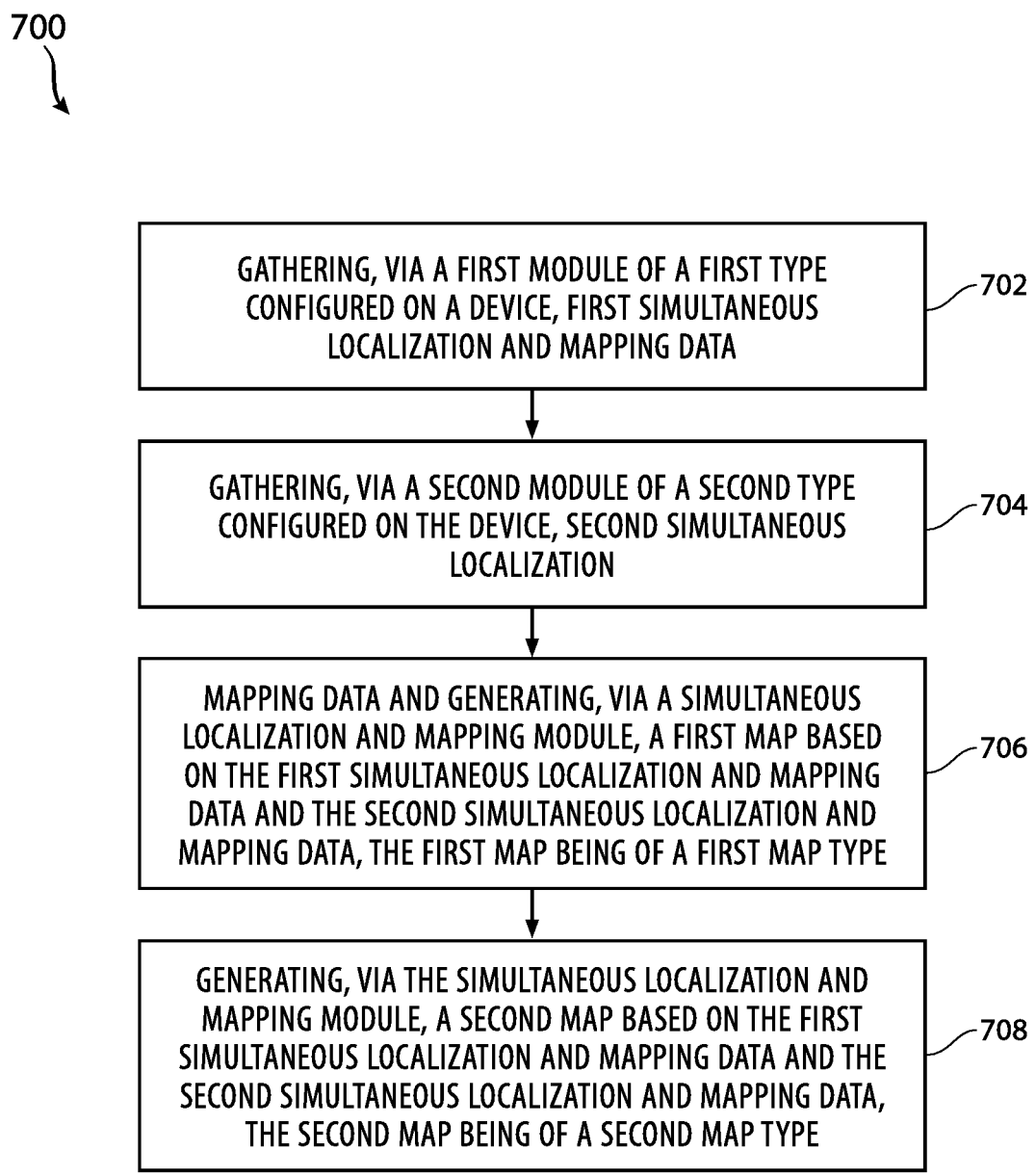
FIG. 7 illustrates an example method for generating the feature-rich map and the feature-poor map.

FIG. 7 illustrates an example method 700 associated with generating a first map and a second map using the approach disclosed herein. A method can include one or more of the following steps, in any order. A method can include gathering, via a first module of a first type configured on a device, first simultaneous localization and mapping data (or data in general) (702), gathering, via a second module of a second type configured on the device, second simultaneous localization and mapping data (or other data in general, such as image data) (704) and generating, via a simultaneous localization and mapping module, a first map based on the first simultaneous localization and mapping data and the second simultaneous localization and mapping data, the first map being of a first map type (706). The method can include generating, via the simultaneous localization and mapping module, a second map based on the first simultaneous localization and mapping data and the second simultaneous localization and mapping data, the second map being of a second map type (708). In one example, the data from the first module includes high quality localization data and the data from the second module is image only data. Since the robot knows its location at the time any respective image was taken from the second module, the system can correlate the location with characteristics of the respective image and generate a mapping of the environment that includes metadata or location-based data that corresponds to particular features in each respective image. Later, a mobile device can take an image of an isle or of a location in warehouse, for example, the generated map can enable the determination of an accurate location of the mobile device. The generated map can be applied to data received from a sensor component on the mobile device that is similar technically to a sensor component on the robot that generated the two maps earlier. Using the generated map can enable a location service which otherwise might not be possible or accurate.

For subsequent localization, the first map can be used for a system configured with either the first module of the first type or a system configured with both the first module of the first type and the second module of the second type. For subsequent localization, the second map can also be used for a system configured with only the second module of second first type.

In one aspect, the first module of the first type includes a high cost module and the second module of the second type can include a low cost module. The first module of the first type can include a high accuracy module and the second module of the second type can include a low accuracy module. These differentiated modules can be determined based on cost, resolution, types of sensors, capability of a sensor to determination location or not, or other factors to determine whether one is a high accuracy module or a low accuracy module. Generally, these are determined by the relative quality of the resolution or output of the respective modules.

The first module of the first type can use one or more of a two-dimensional LiDAR, a three-dimensional LiDAR, an Ultra Wide Band radio, and a wheel odometry system. The second module of the second type in one aspect uses one or more of a inertial measuring unit, a camera, a WiFi sensor, a Bluetooth sensor, a global positioning system and a magnetometer. The above items are listed as non-limiting examples of the different characteristics of the different modules.

A first characteristic of the first map can relate to a first characteristic of a first sensor associated with the first module of the first type. For example, more details about features in the map can be presented. In another aspect, a second characteristic of the second map can relate to a second characteristic of a second sensor associated with the second module of the second type. For example, the second characteristic might be that the device or second sensor only takes images or video and does not inherently provide location-based information.

A system according to this disclosure can include a processor, a first module of a first type configured on the system, a second module of a second type configured on the system, a simultaneous localization and mapping module configured on the system and a computer-readable storage device storing instructions. When the instructions are executed by the processor, the instructions can cause the processor to perform operations including one or more of: gathering, via the first module, first simultaneous localization and mapping data (or other data generally), gathering, via the second module, second simultaneous localization and mapping data (or other data generally), generating, via the simultaneous localization and mapping module, a first map based on the first simultaneous localization and mapping data and the second simultaneous localization and mapping data, the first map being of a first map type. The operations further include generating, via the simultaneous localization and mapping module, a second map based on the first simultaneous localization and mapping data and the second simultaneous localization and mapping data, the second map being of a second map type. These operations can be performed in any order.

For subsequent localization, the first map can be used for a system configured with either the first module of the first type or a system configured with both the first module of the first type and the second module of the second type. Also, for the subsequent localization, the second map can be used for a system configured with only the second module of the second type, such as a lower cost camera included on a mobile phone.

A first characteristic of the first map can relate to a first sensor associated with the first module of the first type. In another aspect, a second characteristic of the second map relates to a second sensor associated with the second module of the second type. The first module of the first type can include a high cost module and the second module of the second type can include a low cost module or they may have different technical capabilities of capturing images or other features of the environment.

In one aspect, a first characteristic of the first map relates to a first sensor associated with the first module of the first type. A second characteristic of the second map can relate to a second sensor associated with the second module of the second type. For example, a level of detail regarding features in a respective map can be higher or lower based on the module used. A number of features on the map, a size of features on a map or a color scheme for those features can depend on whether the data came from one or more of a first module, a second module, a module with a certain resolution, and so forth. The second map might provide a correlation between one type of data, image data for example, and another type of data, such as location data for example.

Figure 8:
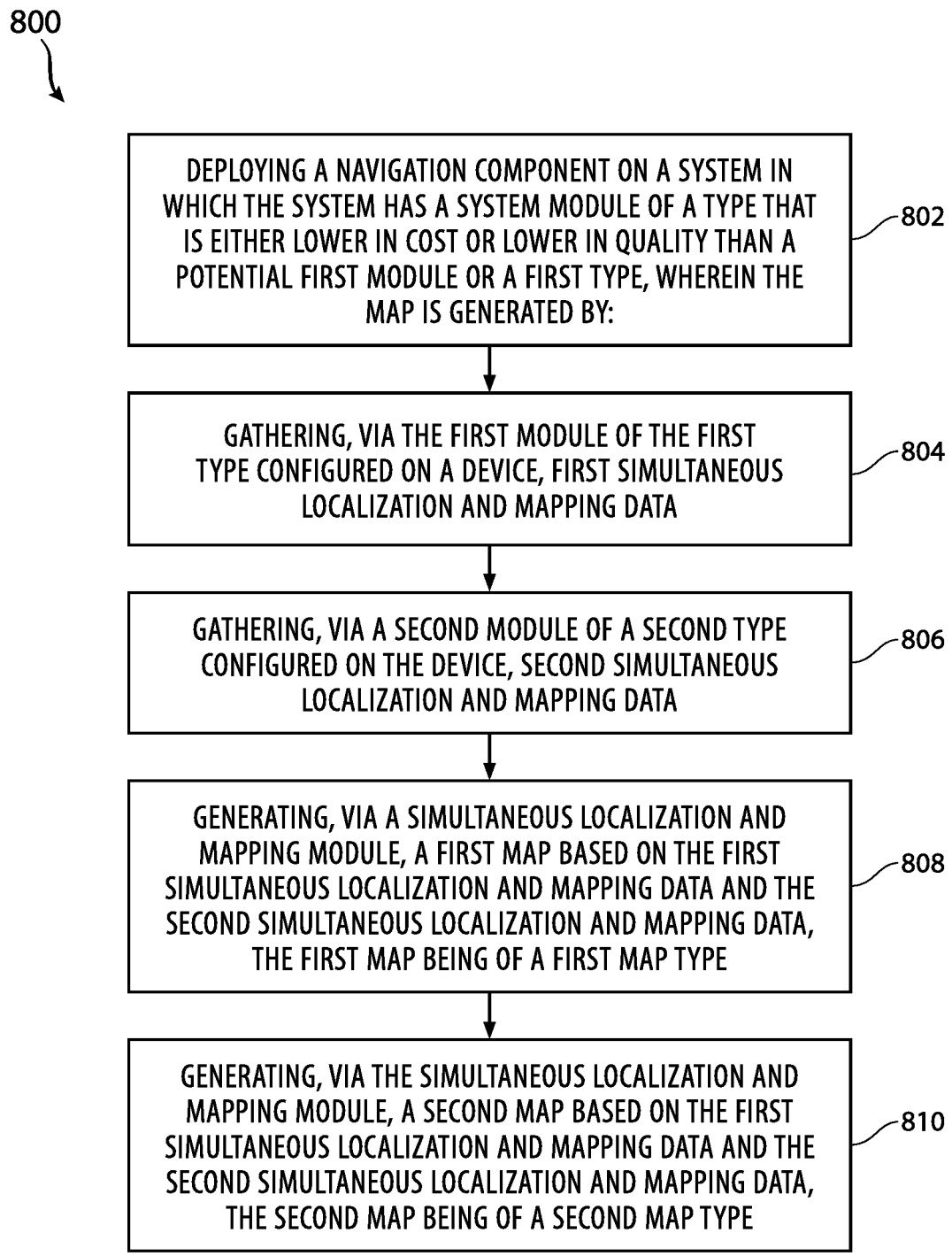
FIG. 8 illustrates an example method of a device having only a low cost and low accuracy localization system using the feature-poor map.

FIG. 8 illustrates an example method 800 for a system that uses a map generated according to the principles disclosed herein. Typically, this system can refer to a robot or other device configured with a certain technical characteristic of its sensor, a less expensive sensor system, or a system of a certain type or characteristic. For example, the robot may have a camera installed but not a more expensive LiDAR system. The camera can provide a different type of data from the LiDAR system, which may or may not be able to provide direct information about location. An example method includes deploying a navigation component on a system in which the system has a system module of a type that is either lower in cost or lower in quality than a potential first module or a first type (802). The system uses the navigation component in connection with a map generated by operations including one or more of: gathering, via the first module of the first type configured on a device, first simultaneous localization and mapping data (or other data) (804), gathering, via a second module of a second type configured on the device, second simultaneous localization and mapping data (or other data generally) (806), and generating, via a simultaneous localization and mapping module, a first map based on the first simultaneous localization and mapping data and the second simultaneous localization and mapping data, the first map being of a first map type (808). The operations can further include generating, via the simultaneous localization and mapping module, a second map based on the first simultaneous localization and mapping data and the second simultaneous localization and mapping data, the second map being of a second map type (810). The map used by the system having a camera installed can correspond to the second map generated. This method is practiced by a robot, for example, having one type of sensor component or module in that the map generated by the operations described above are used by the robot for navigation around an environment.

In another example, one or both of the maps can be used by a robot configured with both the first module of the first type and the second module of the second type. A method can be operated by such a robot with this configuration.

Figure 9:
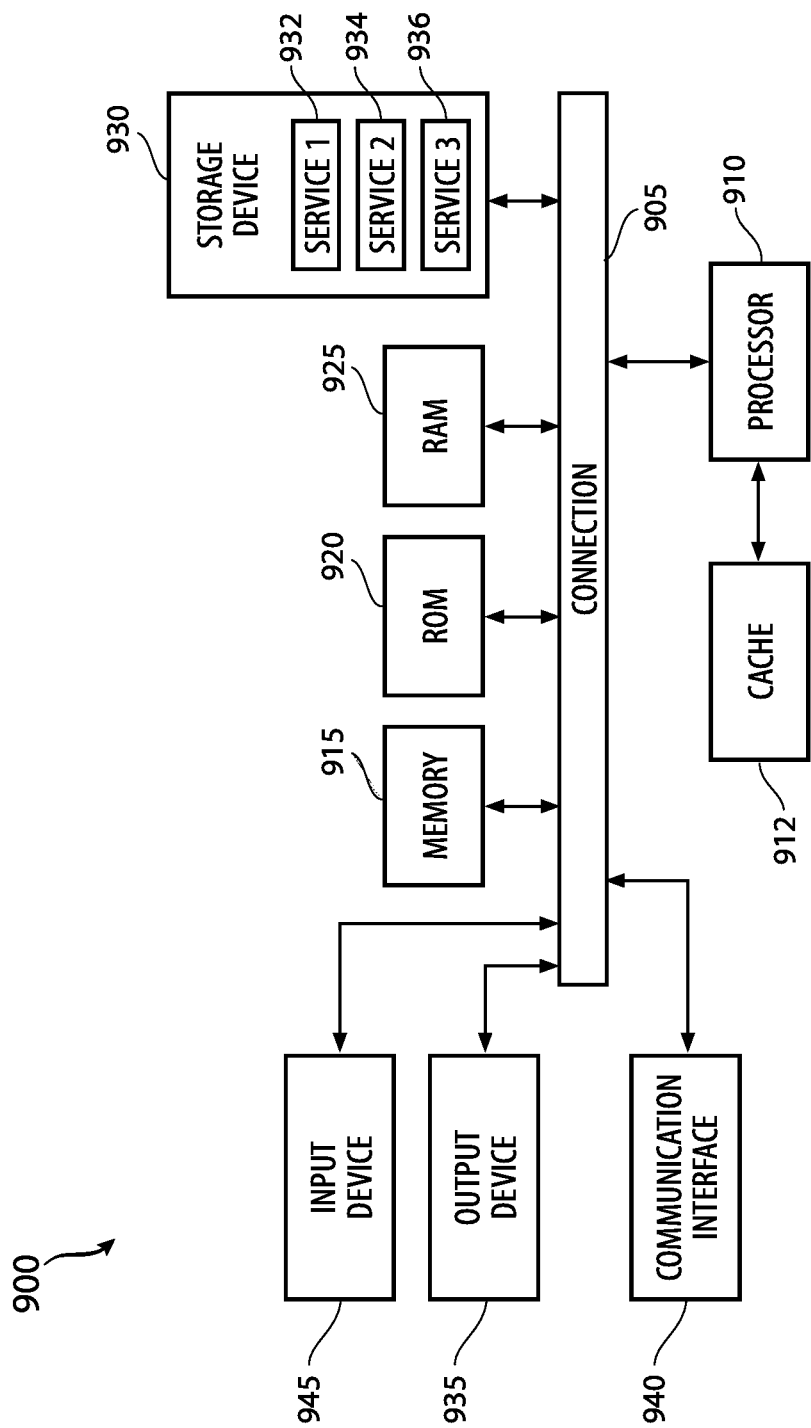
FIG. 9 illustrates example computing components used by various systems of the disclosure.

FIG. 9 illustrates example computer device that can be used in connection with any of the systems disclosed herein. In this example, FIG. 9 illustrates a computing system 900 including components in electrical communication with each other using a connection 905, such as a bus. System 900 includes a processing unit (CPU or processor) 910 and a system connection 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the actual processor design. The processor 910 may be a completely self-contained computing system, containing multiple cores or processors, a bus, memory controller, cache, etc. A multi-core processor may be symmetric or asymmetric.

To enable user interaction with the device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include services 932, 934, 936 for controlling the processor 910. Other hardware or software modules are contemplated. The storage device 930 can be connected to the system connection 905. In one aspect, a hardware module that performs a particular function can include the software component stored in a computer-readable medium in connection with the necessary hardware components, such as the processor 910, connection 905, output device 935, and so forth, to carry out the function.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
gathering, via a first module of a first type configured on a mobile device, first data, wherein the mobile device comprises one of a mobile robot, a vehicle, a drone, or a flying vehicle;
gathering, via a second module of a second type configured on the mobile device, second data;
generating, via a simultaneous localization and mapping module, a first map based on the first data and the second data, the first map being of a first map type; and
generating, via the simultaneous localization and mapping module, a second map based on the first data and the second data, the second map being of a second map type, wherein the first map type differs from the second map type.

2. The method of claim 1, wherein for subsequent localization, the first map is used for a system configured with either the first module of the first type or a system configured with both the first module of the first type and the second module of the second type.

3. The method of claim 1, wherein for subsequent localization, the second map is used for a system configured with only the second module of the second type.

4. The method of claim 1, wherein the first module of the first type comprises a high cost module and the second module of the second type comprises a low cost module.

5. The method of claim 1, wherein the first module of the first type comprises a high accuracy module and the second module of the second type comprises a low accuracy module.

6. The method of claim 1, wherein the first module of the first type uses one or more of a two-dimensional LiDAR, a three-dimensional LiDAR, a Ultra Wide Band radio, radar, and a wheel odometry system.

7. The method of claim 1, wherein the second module of the second type uses one or more of an inertial measuring unit, a camera, a WiFi sensor, a Bluetooth sensor, a global positioning system and a magnetometer.

8. The method of claim 1, wherein a first characteristic of the first map relates to a first sensor associated with the first module of the first type.

9. The method of claim 8, wherein a second characteristic of the second map relates to a second sensor associated with the second module of the second type.

10. A system comprising:
a processor;
a first module of a first type configured on the system, wherein the system comprises one of a mobile robot, a drone, a flying vehicle or a vehicle;
a second module of a second type configured on the system;
a simultaneous localization and mapping module configured on the system; and
a computer-readable storage device storing instructions which, when executed by the processor, cause the processor to perform operations comprising:
gathering, via the first module, first data;
gathering, via the second module, second data;
generating, via the simultaneous localization and mapping module, a first map based on the first data and the second data, the first map being of a first map type; and
generating, via the simultaneous localization and mapping module, a second map based on the first data and the second data, the second map being of a second map type, wherein the first map type differs from the second map type.

11. The system of claim 10, wherein for subsequent localization, the first map is used for a system configured with either the first module of the first type or a system configured with both the first module of the first type and the second module of the second type and wherein, for the subsequent localization, the second map is used for a second system configured with only the second module of the second type.

12. The system of claim 10, wherein the first module of the first type comprises a high accuracy module and the second module of the second type comprises a low accuracy module.

13. The system of claim 10, wherein the first module of the first type uses one or more of a two-dimensional LiDAR, a three-dimensional LiDAR, a Ultra Wide Band radio, and a wheel odometry system and wherein the second module of the second type uses one or more of a inertial measuring unit, a camera, a WiFi sensor, a Bluetooth sensor, a global positioning system and a magnetometer.

14. The system of claim 10, wherein a first characteristic of the first map relates to a first sensor associated with the first module of the first type.

15. The system of claim 14, wherein a second characteristic of the second map relates to a second sensor associated with the second module of the second type.

16. The system of claim 10, wherein the first module of the first type comprises a high cost module and the second module of the second type comprises a low cost module.

17. The system of claim 10, wherein the first module of the first type comprises a high accuracy module and the second module of the second type comprises a low accuracy module.

18. The system of claim 10, wherein the first module of the first type uses one or more of a two-dimensional LiDAR, a three-dimensional LiDAR, a Ultra Wide Band radio, radar, and a wheel odometry system.

19. The system of claim 10, wherein the second module of the second type uses one or more of an inertial measuring unit, a camera, a WiFi sensor, a Bluetooth sensor, a global positioning system and a magnetometer.

20. The system of claim 10, wherein a first characteristic of the first map relates to a first sensor associated with the first module of the first type.

21. The system of claim 20, wherein a second characteristic of the second map relates to a second sensor associated with the second module of the second type.

* * * * *